US007945752B1

(12) United States Patent
Miller et al.

(10) Patent No.: US 7,945,752 B1
(45) Date of Patent: May 17, 2011

(54) METHOD AND APPARATUS FOR ACHIEVING CONSISTENT READ LATENCY FROM AN ARRAY OF SOLID-STATE STORAGE DEVICES

(75) Inventors: Steve C. Miller, Livermore, CA (US); Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 449 days.

(21) Appl. No.: 12/057,301

(22) Filed: Mar. 27, 2008

(51) Int. Cl.
*G06F 12/00* (2006.01)

(52) U.S. Cl. ............... 711/162; 711/E12.008; 711/114; 711/161

(58) Field of Classification Search .................. 711/103, 711/112, 114, 162, 170, 161, E12.008; 714/6, 714/8
See application file for complete search history.

(56) References Cited

U.S. PATENT DOCUMENTS

| | | | |
|---|---|---|---|
| 6,289,356 B1 * | 9/2001 | Hitz et al. ............... | 711/162 |
| 6,516,425 B1 * | 2/2003 | Belhadj et al. ............... | 714/6 |
| 7,389,379 B1 * | 6/2008 | Goel et al. ............... | 711/112 |
| 7,555,620 B1 * | 6/2009 | Manley ............... | 711/162 |
| 7,562,189 B2 * | 7/2009 | Hamilton et al. ............ | 711/114 |
| 7,694,072 B2 * | 4/2010 | Nehse ............... | 711/114 |
| 2008/0120462 A1 * | 5/2008 | Nehse ............... | 711/114 |
| 2009/0113420 A1 | 4/2009 | Pawlowski | |
| 2009/0271563 A1 * | 10/2009 | Gopalan et al. ............... | 711/103 |

OTHER PUBLICATIONS

Sang-Won Lee et al., "A case for flash memory SSD in enterprise database applications", Proceedings of the 2008 ACM SIGMOD international conference on Management of data, pp. 1075-1086, 2008.*

Lei Gao et al., "Application specific data replication for edge services", Proceedings of the 12th international conference on World Wide Web Proceedings of the 12th international conference on World Wide Web, pp. 449-460, 2003.*

Li-Pin Chang, "On efficient wear leveling for large-scale flash-memory storage systems",Proceedings of the 2007 ACM symposium on Applied computing, pp. 1126-1130, Mar. 2007.*

Toru Tanzawa et al.; "A 44-mm2 Four-Bank Eight-Word p.-Read 64-Mb Flash Memory with Flexible Block Redundancy and Fast Accurate Word-Line Voltage Controller"; IEEE Journal of Solid-State Circuits; vol. 37; No. 11; Nov. 2002; pp. 1485-1492.*

Gal, E. and Toledo, S. 2005. Algorithms and data structures for flash memories. *ACM Comput. Surv.* 37, 2 (Jun. 2005), 138-163.

EMC Press Release, "EMC²® Where Information Lives®, EMC in Major Storage Performance Breakthrough; First with Enterprise-Ready Solid State Flash Drive Technology", http://www.prnewswire.com/mnr/emc/31368, 3 pages, Webcast: David Donatelli Discusses EMC's Latest Storage Innovation (Jan. 14, 2008).

EMC Data Sheet, "EMC Symmetrix DMX Series, The World's Most Trusted Storage Platform", 8 pages, Jan. 2008.

Rabin, T. And Ben-Or, M. 1989. Verifiable secret sharing and multiparty protocols with honest majority. In *Proceedings of the Twenty-First Annual ACM Symposium on theory of Computing* (Seattle, Washington, United States, May 14-17, 1989). D. S. Johnson, Ed. STOC '89. ACM, New York, NY, 73-85. DOI= http://doi.acm.org/10.1145/73007.

(Continued)

*Primary Examiner* — Pierre-Michel Bataille
(74) *Attorney, Agent, or Firm* — Perkins Coie LLP

(57) ABSTRACT

A technique for achieving consistent read latency from an array of non-volatile solid-state memories involves an external entity determining the "busy" or "not busy" status of non-volatile solid-state memory elements in a RAID group. An external data layout engine then uses parity based RAID data reconstruction to avoid having to read from any memory element that is busy in a RAID group, along with careful scheduling of writes and erasures.

14 Claims, 10 Drawing Sheets

OTHER PUBLICATIONS

Ellard, D. and Megquier, J. 2005. DISP: Practical, efficient, secure and fault-tolerant distributed data storage. *Trans. Storage* 1, 1 (Feb. 2005), 71-94. DOI= http://doi.acm.org/10.1145/1044956.1044960.
Co-pending U.S. Appl. No. 12/057,277 filed Mar. 27, 2008.
Non-Final Office Action Mailed Sep. 1, 2010 in Co-Pending U.S. Appl. No. 12/057,277 filed Mar. 27, 2008.
Non-Final Office Action Mailed Feb. 3, 2011 in Co-Pending U.S. Appl. No. 12/057,277 filed Mar. 27, 2008.

* cited by examiner

METHOD AND APPARATUS FOR ACHIEVING CONSISTENT READ LATENCY FROM AN ARRAY OF SOLID-STATE STORAGE DEVICES

FIELD OF THE INVENTION

At least one embodiment of the present invention pertains to network storage systems, and more particularly, to a technique for achieving consistent read latency from an array of solid-state storage devices in a network storage system.

BACKGROUND

A storage server is a special purpose computer system used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices may be organized into one or more groups of drives (e.g., redundant array of inexpensive disks (RAID)). A storage server also typically includes internal memory that is used as a buffer cache, to speed up the reading and writing of data from and to (respectively) the main mass storage system. In conventional storage servers, this buffer cache typically is implemented the form of dynamic random access memory (DRAM).

A storage server may be configured to service file-level requests from clients, as in the case of file servers used in a network attached storage (NAS) environment. Alternatively, a storage server may be configured to service block-level requests from clients, as done by storage servers used in a storage area network (SAN) environment. Further, some storage servers are capable of servicing both file-level and block-level requests, as is the case with certain storage servers made by Network Appliance, Inc. of Sunnyvale, Calif.

It is desirable to improve the performance of storage servers, and one way to do so is by reducing the latency and increasing the random access throughput associated with accessing a storage server's main mass storage subsystem. In this regard, flash memory, particularly NAND flash memory, has certain very desirable properties. Flash memory generally has a very fast read access speed compared to that of conventional disk drives. Also, flash memory is substantially cheaper than conventional DRAM and is not volatile like DRAM.

However, flash memory also has certain characteristics that make it unfeasible simply to replace the DRAM or disk drives in a storage server with flash memory. In particular, conventional flash memories, such as flash solid-state drives (SSDs), include an on-board memory controller which implements a data layout engine. The data layout engine typically implements a log based system to decide where data should be written in flash and to identify locations in flash where desired data is stored. This internal data layout engine adds a non-trivial amount of overhead to the processes of reading and writing data, which tends to offset the performance gains that could otherwise be achieved by using flash.

In addition, while flash memory generally has superior read performance compared to conventional disk drives, its write performance is generally not as good. One reason is that each time a unit of flash memory is written, it must first be erased, which adds latency to write operations.

Furthermore, the smallest individually erasable unit in a flash memory, which is called a "block", is generally much larger than the smallest individually writable unit, which is called a "page"; for example, a typical page (minimum writable unit) may be 2 kB while a corresponding block (minimum erasable unit) is 64 pages (e.g., 128 kB). Consequently, if a single 2 kB page were to be modified in flash, that would involve first reading back the entire 128 kB block that includes the page, erasing the entire 128 kB block, and then writing the entire 128 kB block back, including the modified version of the 2 kB page. This process is extremely inefficient in terms of latency. Further, this process causes wear on the flash memory cells, which typically have finite lifespans in terms of the number of erases that can be performed on them before failure.

In addition, conventional flash memory used in SSDs requires that writes be done in sequential page order within a block (whereas reads can be random). The SSD internally translates random writes that it receives into sequential writes, which can dramatically lower the performance of the SSDs. Even if sequential writes are performed to an SSD, this translation layer is used, which can increase overhead per unit of performance.

Furthermore, while flash memory generally has very good read performance compared to conventional disks, the latency associated with reads is often highly variable within any given system, even for a given flash chip. When accessing an example of one of today's SSD, with a mix of random read and write operations, this behavior can be observed in that approximately 5% of all reads return in 2-4 msec, whereas the other 95% return in an average of 850 μsec or less. It is believed that this variability is caused by random accesses to a flash device which is in the process of erasing, causing a delay in access to the data. In the case of SSDs, the initial access is much longer; hence, the delay caused by the erase is not amplified as much as in raw flash, but it still exists.

This variability does not lend itself well to predictable system behavior. To understand the cause of this variability, consider how conventional flash memory is normally implemented. NAND-based flash memory shall be discussed here for purposes of illustration.

In NAND-based flash devices, data is read and written in units of pages but erased in units of blocks. The page size varies between devices, but currently the page size is 2 kB and expected to grow to 8 kB over the next few years. Block size is expected to grow similarly to maintain the 64 page per block ratio. Access to a flash memory occurs in two phases, which are referred to here as the operation and the data transfer. The data transfer is where data is transferred to or from an internal buffer in the flash chip, to the system over a bus interface on the flash chip. The operation can be defined as the transfer of data to or from the internal buffer to the NAND flash array or any of various other operations, such as erasing a block.

Most flash devices provide for some minimum level of concurrency between data transfer and operations, by providing two or more memory planes. This configuration requires that overlapped operations be targeted at different memory planes. Operations targeted to the same plane must be processed sequentially.

Consider now the following illustrative access latencies associated with conventional flash memory. A 2 kB data transfer of data may take approximately 50 μsec for either a read or write to load the internal data buffer on the flash chip, while a read page operation may take approximately 20 μsec for that same 2 kB data block, and a write page operation may take approximately 200 μsec for that same 2 kB of data. The erase operation, as mentioned above, may erase 64 pages, or 128 kB in about 2,000 μsec. A complete system read would take approximately 70 μsec to fully return the data. If another read were pending at that time, the total time would extend to 140 μsec. If a write or erase was in progress ahead of the read, the time could extend to 270 μsec in the case of a write or 2,070 μsec in the case of an erase. Having a 30-fold variability in the access time does not lend itself well to predictable behavior.

The above-mentioned performance times are based on floating gate NAND flash technology. Newer generation NAND flash devices are expected to be based on a charge trap design, which will allow smaller memory cells but at the cost of increased erase and write times. The increase in erase time may be many times that of current NAND flash devices. Such an increase will further exacerbate the read access time variability.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
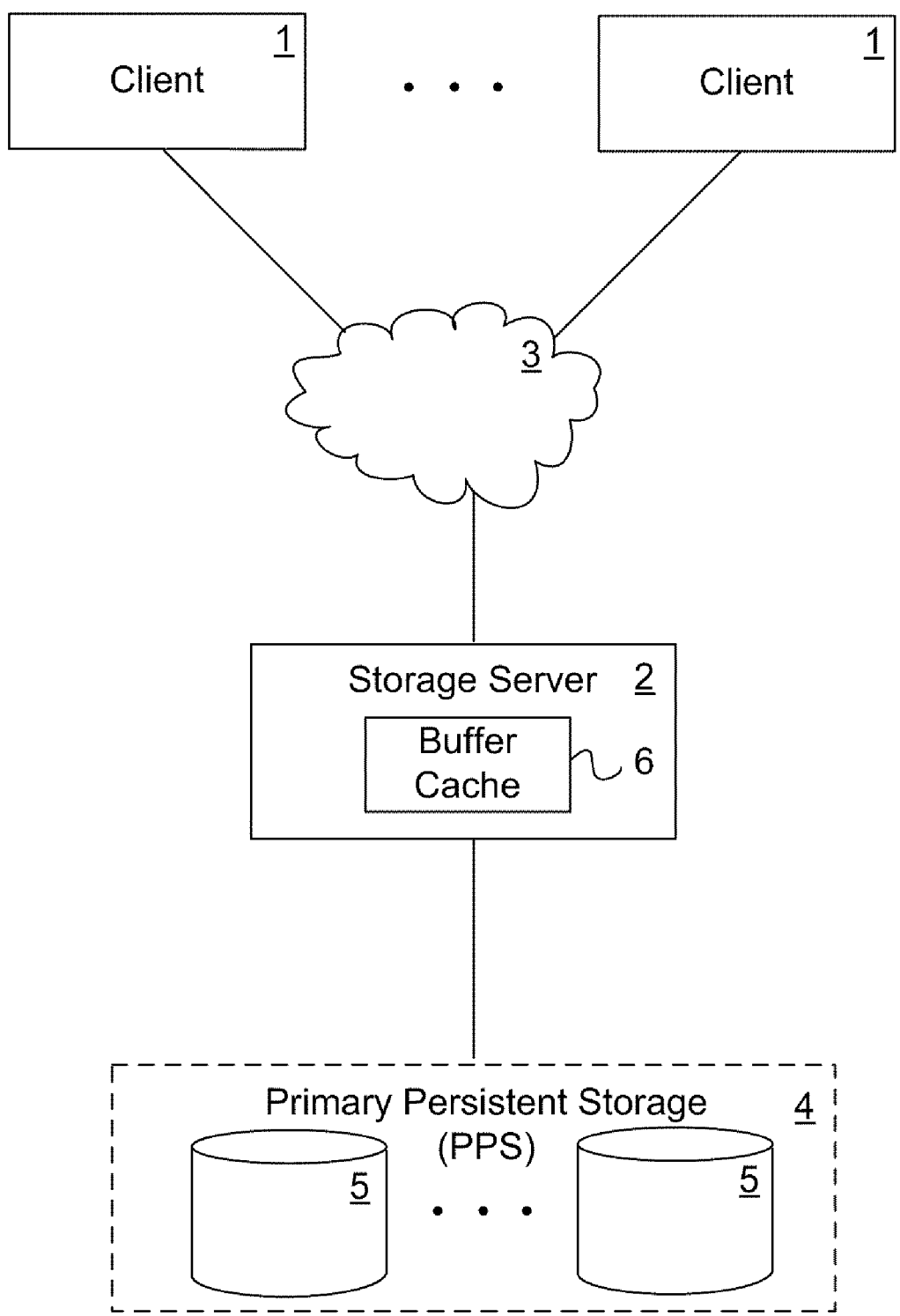
FIG. 1 illustrates a network storage system in which the present invention can be implemented.

A method and apparatus for facilitating the use of flash memory (or any other non-volatile solid-state memory with similar properties) in a network storage system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

To overcome the problems noted above, "raw" flash memory is incorporated into a storage system, and the storage of data in that flash memory is controlled by an external (relative to the flash device), log structured data layout engine of a storage server which employs a write anywhere storage policy. By "raw" flash memory, what is meant is a flash memory device that does not have any on-board data layout engine (in contrast with conventional flash SSDs). A "data layout engine" is defined herein as any element (implemented in software and/or hardware) that decides where to store data and determines where to locate data that is already stored. "Log structured", as the term is defined herein, means that the data layout engine lays out its write patterns in a generally sequential fashion (similar to a log) and performs all writes to free blocks.

By avoiding a separate, onboard data layout engine on the flash devices, the overhead associated with operation of such a data layout engine is also avoided. The flash memory can be used as the primary persistent storage of a storage server, or as the buffer cache of a storage server, or both (or as a portion thereof). Further, the flash memory can be made accessible to multiple storage servers, such as in a storage cluster.

In some embodiments, the external data layout engine of the storage server implements a "write out-of-place" (also called "write anywhere") policy when writing data to the flash memory (and generally), as described further below. In this context, writing out-of-place means that whenever a logical data block is modified, that data block, as modified, is written to a new physical storage location, rather than overwriting it in place. (Note that a "logical data block" managed by the data layout engine in this context is not the same as a physical "block" of flash memory. A logical block is a virtualization of physical storage space, which does not necessarily correspond in size to a block of flash memory. In one embodiment, each logical data block managed by the data layout engine is 4 kB, whereas each physical block of flash memory is much larger, e.g., 128 kB.) Because the flash memory does not have any internal data layout engine, the external write-out-of-place data layout engine of the storage server can write data to any free location in flash memory. Consequently, the external write-out-of-place data layout engine can write modified data to a smaller number of erase blocks than if it had to rewrite the data in place, which helps to reduce wear on flash devices.

Also introduced below is a technique to reduce the variability in read latency associated with flash memories. Briefly stated, in one embodiment this technique involves each flash device (e.g., each chip, row of chips, plane within a chip, DIMM or other type of memory module, etc., depending on implementation) providing its status ("busy" or "not busy") to the external data layout engine. The external data layout engine then uses a parity based RAID data reconstruction technique to avoid having to read from any flash device that is busy (along with careful scheduling of writes and erasures).

Refer now to FIG. 1, which shows a network storage system in which the present invention can be implemented. In FIG. 1, a storage server 2 is coupled to a primary persistent storage (PPS) subsystem 4 that includes multiple non-volatile mass storage devices, and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The mass storage devices 5 in the storage subsystem 4 can be, for example, conventional magnetic or optical disks or tape drives; or, in accordance with the techniques introduced here, they can be non-volatile solid-state memory, such as flash memory. The storage devices 5 in storage subsystem 4 can be organized as a Redundant Array of Inexpensive Disks/Devices (RAID), in which case the storage server 2 accesses the storage subsystem 4 using one or more well-known RAID algorithms. The storage server 2 also includes an internal buffer cache 6, which can be implemented as DRAM, for example, or, in accordance with the techniques introduced here, the buffer cache can be implemented as non-volatile solid-state memory, such as flash memory.

The storage server 2 may be a file-level server such as used in a NAS environment (i.e., a "filer"), a block-level storage server such as used in a SAN environment, or a storage server which is capable of both file-level and block-level operation. Although the storage server 2 is illustrated as a single unit in FIG. 1, the storage server 2 can have a distributed architecture. For example, the storage server 2 can include a physically separate N-blade and D-blade which communicate over an interconnect (not shown).

The techniques introduced here can be used to enable the PPS subsystem 4 to be implemented with raw flash memory, which can be used by or accessible to multiple storage servers, such as in a cluster failover configuration. An example of such a configuration is shown in FIG. 2.

Figure 2:
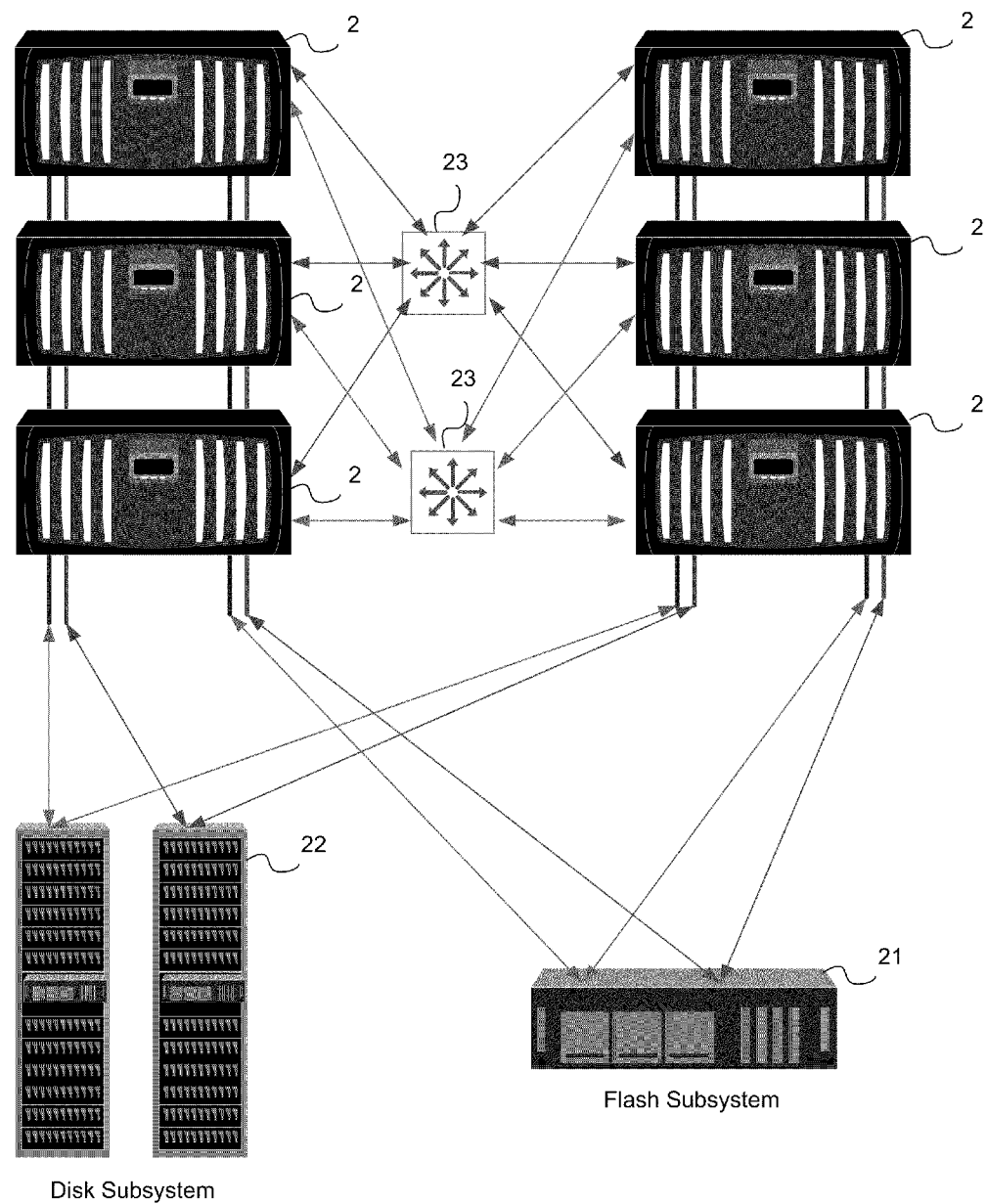
FIG. 2 shows an example of a clustered storage system which includes multiple storage servers, a disk subsystem and a flash subsystem.

FIG. 2 shows a cluster of storage servers 2, connected to each other via a cluster interconnect (e.g., network switches 23). Each of the storage servers 2 is also coupled to a set of conventional disk drives 22 and to a flash subsystem 21. The flash subsystem 21 can be used as any (or all) of the storage servers' PPS, as cache, or a combination of PPS and cache. As a cache, the flash subsystem 21 can provide extremely fast response times as well as staging data to the disks, transforming random write operations into virtually continuous streaming writes, thus allowing the disks 22 to be operated in the most efficient manner. As shown, the overall storage system is relatively large, containing many storage servers 2, disks, and flash components. Much smaller systems can also be build to take advantage of this technique. Note also that while the flash subsystem 21 is shown to be external to the storage servers 2 in FIG. 2, it could alternatively be implemented within one of the storage servers 2.

Figure 3:
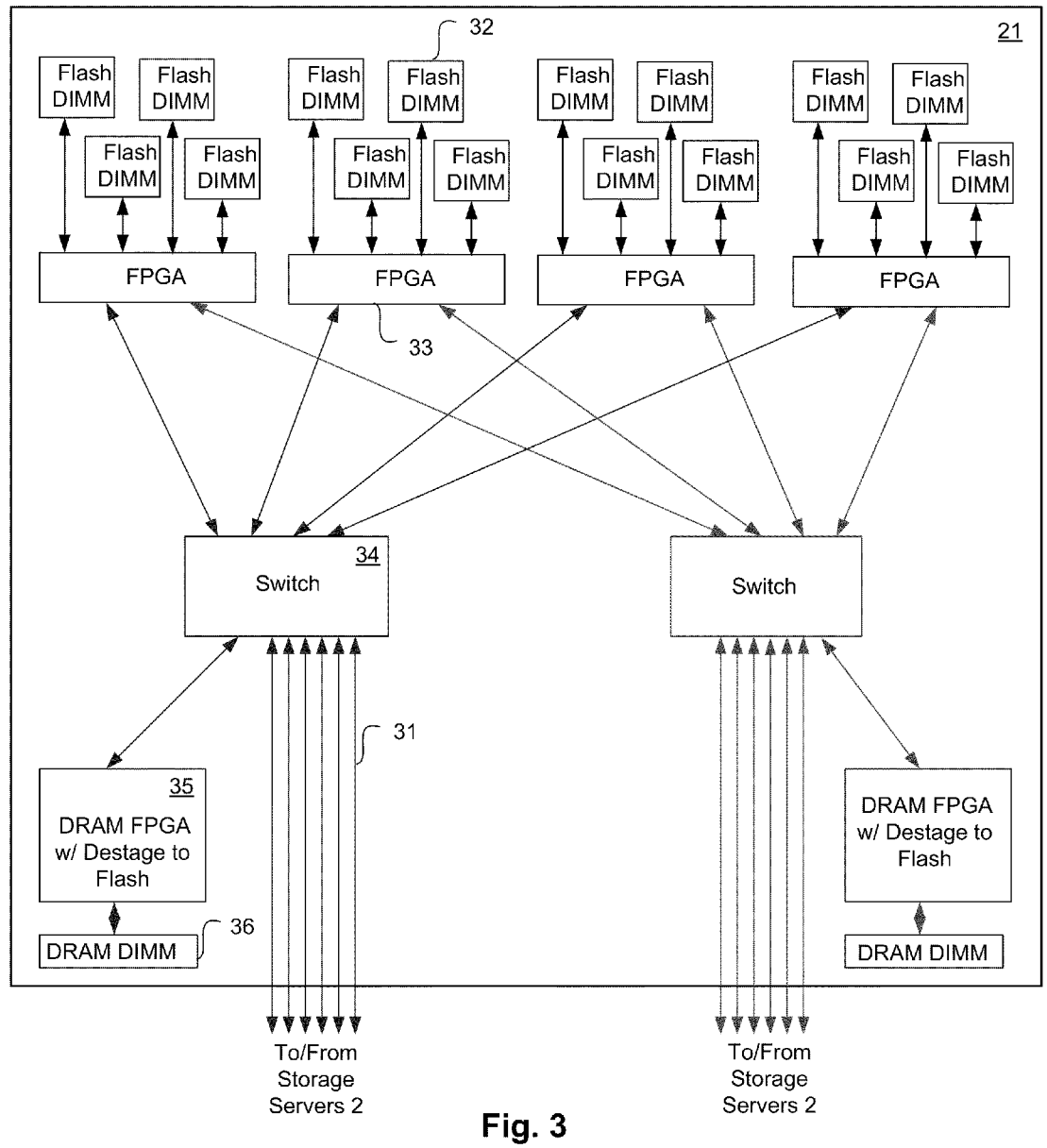
FIG. 3 shows an example of a flash subsystem.

FIG. 3 shows an example of the flash subsystem 21 according to an embodiment of the invention. In the illustrated embodiment, the flash subsystem 21 includes: a host interconnect 31, a number of NAND flash memory modules 32, and a number of flash controllers 33, shown as field programmable gate arrays (FPGAs). To facilitate description, the memory modules 32 are henceforth assumed to be DIMMs, although in another embodiment they could be a different type of memory module. In one embodiment, these components of the flash subsystem 21 are implemented on a conventional substrate, such as a printed circuit board or add-in card.

In the basic operation of the flash subsystem 21, data is scheduled into the NAND flash devices by a data layout engine that is external to the flash subsystem 21, running on one of the storage servers 2. An example of such a data layout engine is described below in connection with FIG. 5. To maintain data integrity, in addition to the typical error correction codes used in each NAND flash component, RAID data striping can be implemented (e.g., RAID-3, RAID-4, RAID-5, RAID-6, RAID-DP) across each flash controller 33.

In the illustrated embodiment, the flash subsystem 21 further includes one or more switches 34, where each flash controller 33 is coupled to the interconnect 31 by one such switch 34. In one embodiment, the host interconnect 31 is a PCI express (PCIe) bus, and each switch 34 is a PCIe switch. In the illustrated embodiment, the flash subsystem 21 further includes a DRAM buffer (DIMM) 36 for each switch 34, which is used for short-term storage of data to be staged from, or destaged to, the flash devices 32. A separate DRAM controller 35 (e.g., FPGA) is used to control each DRAM buffer 36 and to couple the DRAM buffer 36 to the switch 34.

In contrast with conventional SSDs, the flash controllers 33 do not implement any data layout engine; they simply interface the specific signaling requirements of the flash DIMMs 32 with those of the host interconnect 31. As such, the flash controllers 33 do not implement any data indirection or data address virtualization for purposes of accessing data in the flash memory. All of the usual functions of a data layout engine (e.g., determining where data should be stored and locating stored data) are performed by an external data layout engine in one or more of the storage servers 2. Due to the absence of a data layout engine within the flash subsystem 21, the flash DIMMs 32 are referred to as "raw" flash memory.

Note that the external data layout engine may use knowledge of the specifics of data placement and wear leveling within flash memory. This knowledge and functionality could be implemented within a flash abstraction layer, which is external to the flash subsystem 21 and which may or may not be a component of the external data layout engine.

Figure 4:
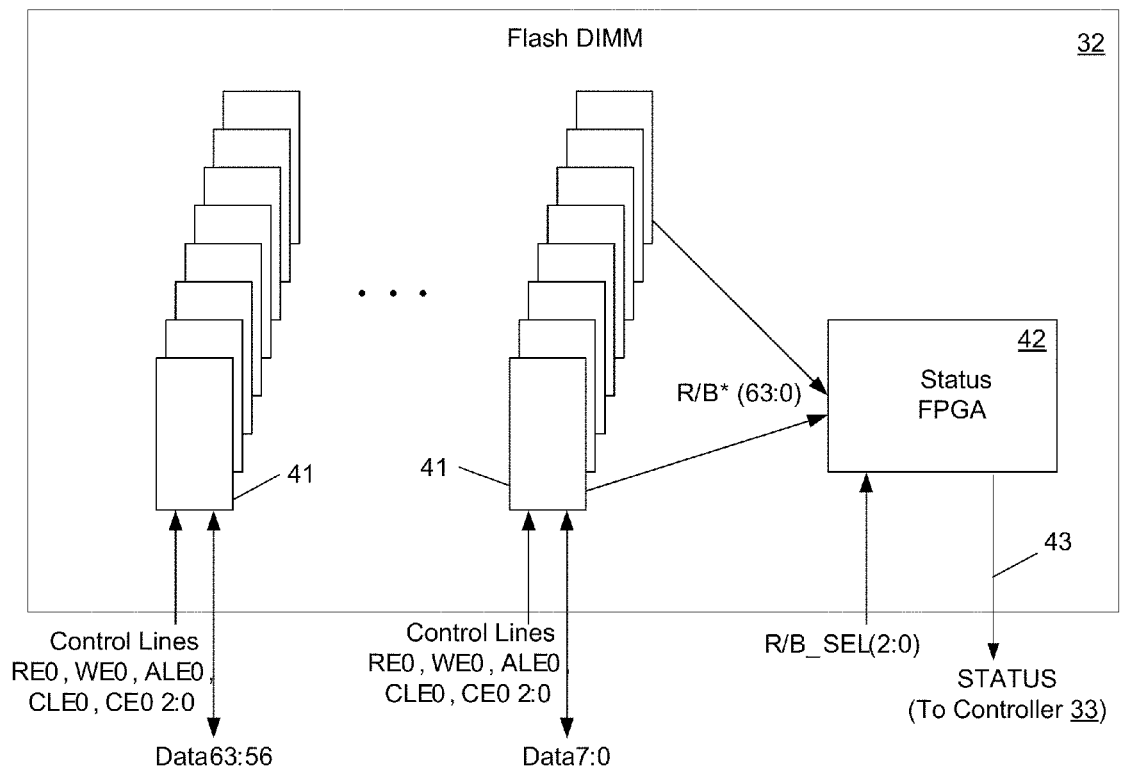
FIG. 4 an example of the architecture of a flash memory module in the flash subsystem.

FIG. 4 illustrates the design of a flash DIMM 32, according to an embodiment of the invention. In one embodiment, each flash DIMM 32 includes an N×M array of NAND flash devices (chips) 41 and a status FPGA 42. FPGA 42 receives the Ready/Busy* (R/B*) signals from each flash chip 41 in the array and multiplexes them on a packet based transport mechanism to optimize the quantity of pins required on both the DIMMs 32 and the FPGAs 33.

In one embodiment, N and M are both eight (8), and there are 16 flash DIMMs 32 and four flash controllers 33, each of which controls four flash DIMMs 32 (other configurations could of course be used). This design allows individual control of each of the 64 NAND flash device 41 on the DIMM 32, where each flash controller 33 accesses four DIMMs 32. This design further allows 32 different operations to be invoked simultaneously, with up to 256 operations in process per flash controller 33.

Operation of the flash subsystem 21 as described above allows multiple operations to be in progress concurrently, to optimize performance and reduce latency. However, as discussed in the Background section above, if the external data layout engine requests data stored in a flash DIMM 32 in which there is a pending erase operation, that request (read) would be required to wait until the erase operation completes. In the future, when charge trap devices are used, the resulting delay could be thousands of times greater than the typical access time.

To overcome this problem, in accordance with an embodiment of the invention the following approach may be used. Referring still to FIG. 4, each NAND flash DIMM 32 has a status output signal line 43 which indicates the status of individual flash chips or rows of flash chips, as selected by the R/B_SEL signal, and which thereby lets the flash controller 33 know when the last requested operation has completed. In alternative embodiments, an FPGA might instead use a status command to obtain status for each chip, or for an individual plane within a chip, rather than using the R/B signals.

Figure 7:
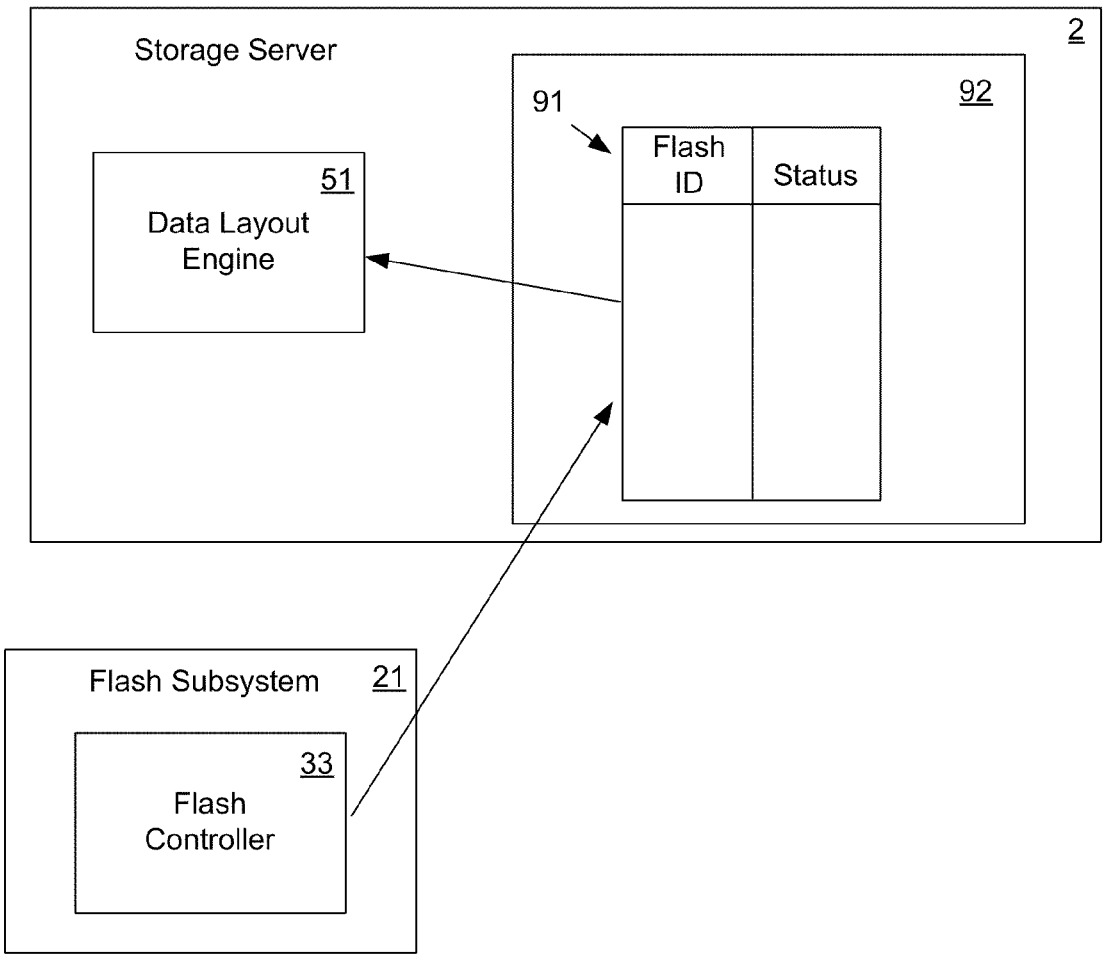
FIG. 7 shows the functional relationship between the data layout engine of a storage server, the flash subsystem and a data structure that indicates flash device status.

The flash controller 33 also tracks the last requested operation to each flash DIMM 32. As indicated in FIG. 7, when that operation is an erase, the flash controller 33 updates a data structure 92 in main memory 93 of the storage server 2 (or potentially, such a data structure in each storage server 2) indicating that the specific flash chip (or row of chips) is busy performing an erase. The data structure 91 can be in the form of a simple table that associates a unique identifier for each flash DIMM 32 in the flash subsystem 21 with a corresponding status indication, which can be in the form of a single bit (e.g., to indicate "busy" or "not busy").

The data structure 91 is accessed by the data layout engine 51 of a storage server 2 when data is needed from the flash subsystem 21 and prior to the storage server requesting data from the flash subsystem 21. If a flash chip (or row) where the requested data resides is currently performing an erase operation (as indicated by a "busy" indication in the data structure 91), the data layout engine 51 requests a read of the other (not busy) flash chips (or rows) in the RAID group that contains the busy device. Once the data is read from the other chips in the RAID group, the requested data can be reconstructed from that data, by using a conventional RAID data reconstruction technique, such as RAID-3, RAID-4, RAID-5, RAID-6, or RAID-DP parity-based data reconstruction (one or more additional flash DIMMs may be included in each RAID group for storing parity information that can be used for this purpose). This operation may be performed by a RAID software layer within the storage server 2, as described for the below.

By careful scheduling, the data layout engine allows erasures in only a single member (e.g., flash chip or row of chips) of any RAID group at a time. In some embodiments, this is accomplished by allowing multiple erasures in a single row of a DIMM 32, but not concurrent erasures by multiple flash controllers 33. Various forms of RAID striping could allow more than one erase within an FPGA group, while still allowing only a single erasure within a RAID group. Also, relatively strong forms of RAID (e.g., RAID-6 or RAID-DP) or other similar algorithms could allow more than one erase or write per RAID group, since they have stronger error protection.

In another embodiment, status of the flash subsystem 21 is tracked by a lower layer in a storage server, such as the RAID layer. Further, in another embodiment, the data layout engine 51 (or other software layer) does not use status indications from the flash subsystem hardware or a data structure 91 to determine which flash devices are busy. Instead, it simply assumes that any erase/write operation queued to a group of devices (e.g., chips) implies that they are busy until that operation is reported as complete.

Figure 5:
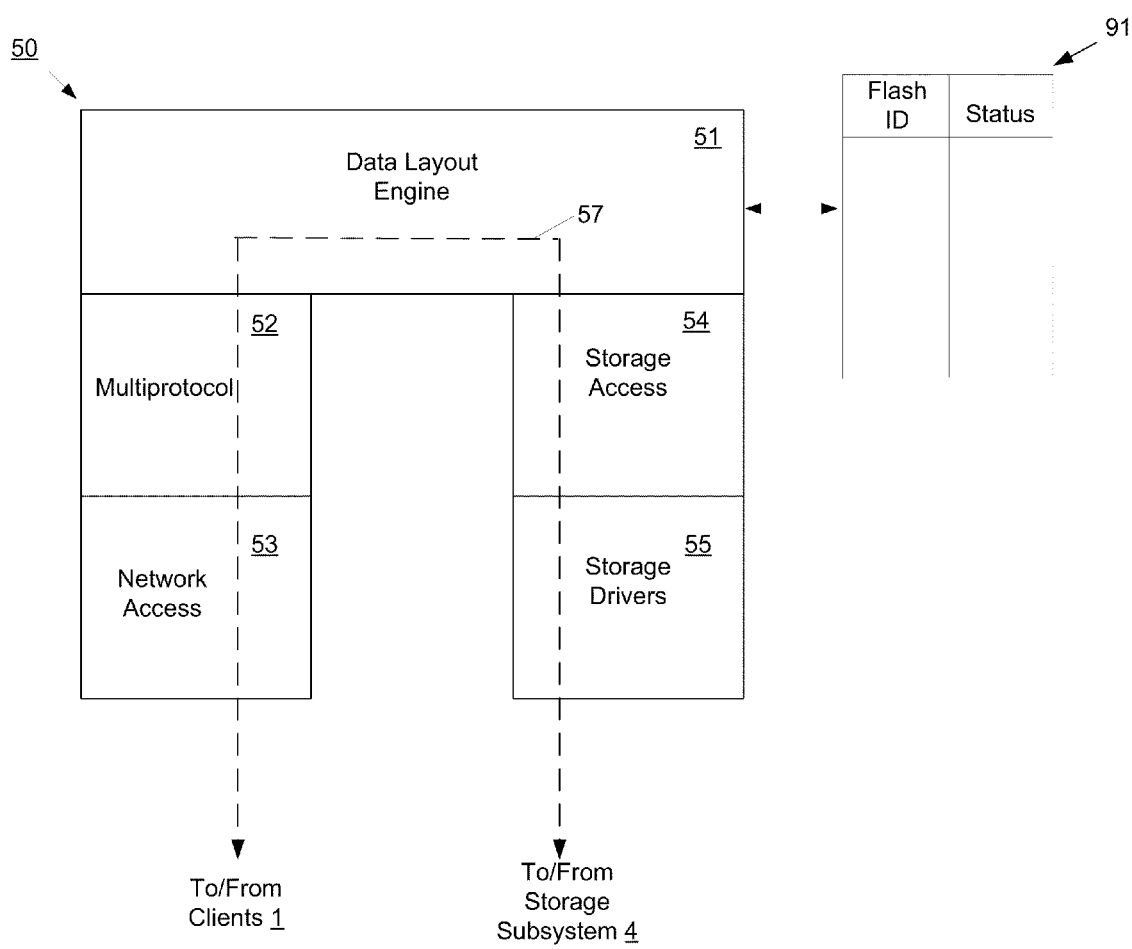
FIG. 5 schematically illustrates an example of a storage operating system that can be implemented in a storage server.

FIG. 5 schematically illustrates an example of a storage operating system that can be implemented in each of the storage servers 2. As shown, the storage operating system 50 includes several software modules, or "layers". These layers include a data layout engine 51, which is the core functional element of the storage operating system 50. The data layout engine 51 is application-layer software which imposes a structure (e.g., a hierarchy) on the data stored in the PPS subsystem 4 and which services read and write requests from clients 1. In one embodiment, the data layout engine 51 manages a log structured file system and implements a "write out-of-place" (also called "write anywhere") policy when writing data to the PPS subsystem 4 (which can be implemented with raw flash memory in the manner described above). In other words, whenever a logical data block is modified, that logical data block, as modified, is written to a new physical storage location (physical block), rather than overwriting the data block in place. As mentioned above, this characteristic removes the need (associated with conventional flash memory) to erase and rewrite the entire block of flash anytime a portion of that block is modified. As shown, the data layout engine 51 has access to the data structure 91, which is populated by the controllers 33 in the flash subsystem 21, and which indicates the status (busy or not busy) of each flash DIMM 32 in the flash subsystem 21.

Logically "under" the data layout engine 51, to allow the storage server 2 to communicate over the network 3 (e.g., with clients 1), the storage operating system 50 also includes a multiprotocol layer 52 and a network access layer 53. The multiprotocol 52 layer implements various higher-level network protocols, such as Network File System (NFS), Common Internet File System (CIFS), Hypertext Transfer Protocol (HTTP), user datagram protocol (UDP) and Transmission Control Protocol/Internet Protocol (TCP/IP). The network access layer 53 includes one or more network drivers that implement one or more lower-level protocols to communicate over the network, such as Ethernet, Fibre Channel or Internet small computer system interface (iSCSI).

Also logically under the data layout engine 51, to allow the storage server 2 to communicate with the PPS subsystem 4, the storage operating system 50 includes a storage access layer 54 and an associated storage driver layer 55. The storage access layer 54 implements a higher-level storage redundancy algorithm, such as RAID-3, RAID-4, RAID-5, RAID-6 or RAID-DP, while the storage driver layer 55 implements a lower-level storage device access protocol, such as Fibre Channel Protocol (FCP) or small computer system interface (SCSI). Also shown in FIG. 5 is the path 57 of data flow, through the operating system 50, associated with a read or write operation.

One function of the storage access layer 54 can be to implement a RAID algorithm across flash devices in the flash subsystem 21. This can include reconstructing data from a flash device that is busy in response to a read request, by using data from the flash devices that are not busy in the same RAID group. An example of this technique is described further below. In other embodiments, the data layout engine 51 may access the flash subsystem 21 directly, i.e., without going through the storage access layer 54 (as when accessing the buffer cache 6).

Figure 6:
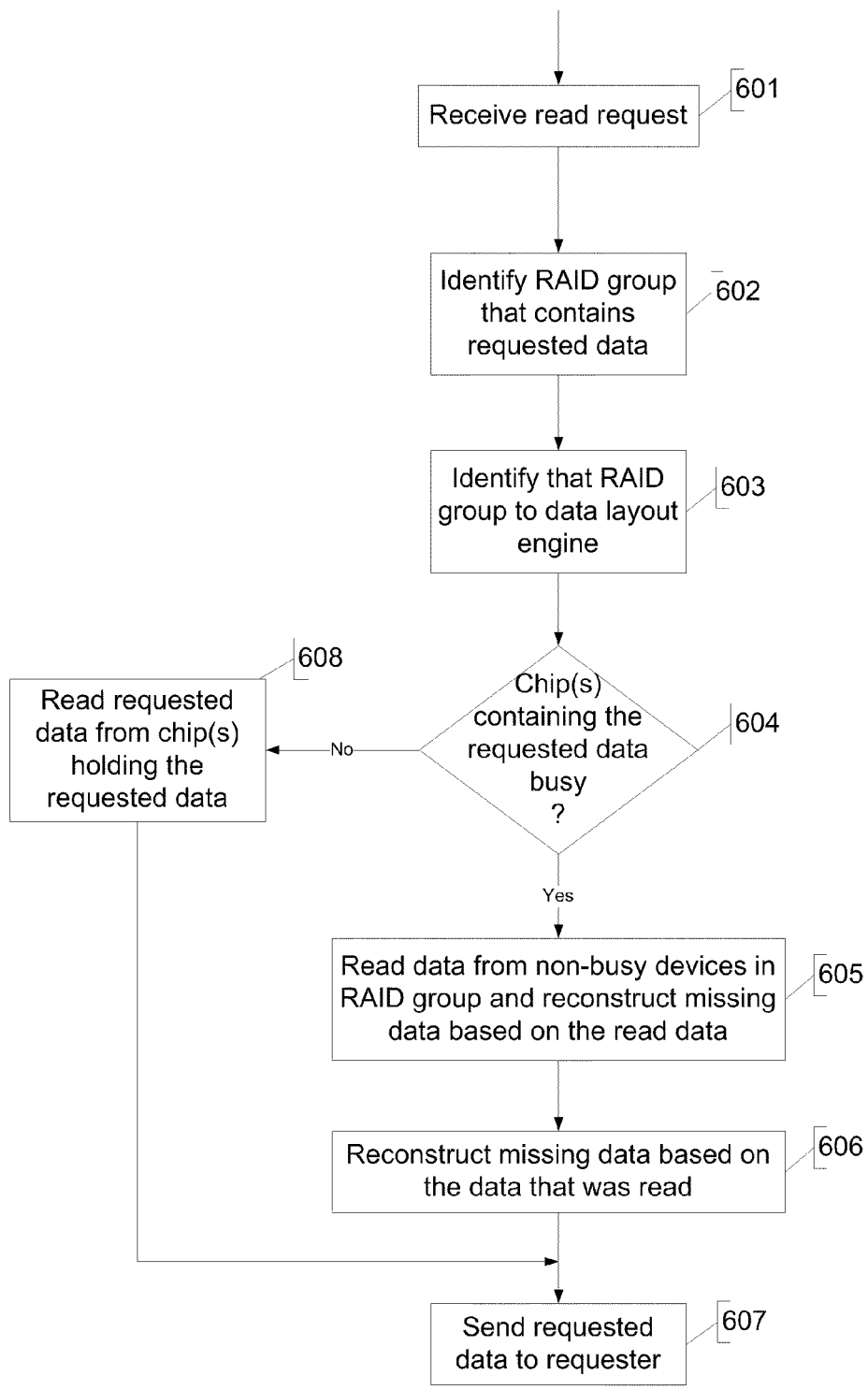
FIG. 6 shows an example of a process flow associated with a read request that involves access to the flash subsystem.

FIG. 6 shows an example of the process flow associated with a read request that involves access to the flash subsystem 21, according to an embodiment of the invention. As noted above, the RAID scheme described above can be implemented across multiple flash DIMMs, or across the flash chips within a particular DIMM. Therefore, for purposes of this description, it is to be understood that the terms "device", "member" and "member device" generally can refer to a flash chip, a flash DIMM, or other type of memory structure, depending on how the RAID scheme is implemented, except where a particular type of device is specifically mentioned. Any specific mention of a particular type of device herein should be understood to be an example provided only for purposes of illustration, not limitation.

Initially, at 601 the data layout engine 51 of a storage server 2 receives a client initiated read request for a set of data (e.g., a file or a range of blocks). The data layout engine 51 then invokes the storage access layer 54, which at 602 identifies the RAID group of flash devices containing the requested data. As noted above, RAID-3 striping and reconstruction can be employed, for example, for purposes of this technique. The storage access layer 54 then communicates this information back to the data layout engine 51 at 603, which accesses the above-mentioned data structure to determine at 604 whether any flash device in that RAID group is currently busy. (As indicated above, in other embodiments, flash device status can be tracked and accommodated within the storage access layer 54 rather than the data layout engine 51, and can be done without knowledge of actual hardware status signals from the flash subsystem 21.) If the chip(s) containing the requested data is/are not busy, the data layout engine 51 signals the storage access layer 54 at 608 to read the requested data from the chip(s) holding the requested data. The data is then returned to the data layout engine 51, which causes the data to be returned to the requesting client 1 at 607 (via the multiprotocol layer 52 and the network access layer 53).

If, on the other hand, the chip(s) containing the requested data is/are busy, the data layout engine 51 signals storage access layer 54 at 605 to read the requested data from the remaining (not busy) devices in the RAID group and to apply a conventional RAID data reconstruction technique to supply the portion of the data in the busy device, as described further below. Once the complete requested set of data is returned to the data layout engine 51, the data layout engine 51 causes the data to be returned to the requesting client 1 at 607.

Thus, the techniques introduced above can be used to enable raw flash memory to be used as either a buffer cache, persistent mass storage, or both, in a network storage system.

The RAID reconstruction technique described above can be adapted for use on individual flash structures within a DIMM, as noted above, and as will now be described with reference to FIG. 8. In such cases, the RAID striping, parity calculation and reconstruction may be performed by an additional data access scheduling engine within the flash subsystem 21 (in contrast with the embodiments described above). As noted above, each flash chip 41 outputs a Ready/Busy* (R/B*) signal to indicate its status. The information provided by these signals can be used in the manner described above by the entity that implements the RAID striping, parity calculation and reconstruction across a DIMM.

The technique can be applied to any N×M array of memory devices. To facilitate description, the example used here uses an 8×9 array of flash chips 41 (e.g., a DIMM 32), configured as 8 rows by 9 columns (i.e., N=8, M=9), as shown in FIG. 8.

In the illustrated embodiment, data (D) is striped across eight (8) columns, in each row, on data lines D[63:0] (i.e., 64 data bits), and a simple parity byte (P) is written to the flash chip in column P on data bits P[7:0]. In the illustrated embodiment, each row of the array is defined as a RAID group, although in other embodiments RAID groups can be defined differently, not necessarily be based on rows of flash chips. In the illustrated embodiment, reading data normally involves accessing all of the flash devices (chips) 41 that store data, in a single row (RAID group). Since writes and erases take significantly more time to complete than reads, any collision where a read needs access to a flash device 41 currently performing an erase or write would normally be required to wait a significant amount of time. If erase and write operations are limited to only one flash device 41 (e.g., chip) in each row (or, more generally, to one member of each RAID group), then this assures that a read of any given row (or, more generally, RAID group) will have at most one flash device 41 busy with an erase or write at any given time. An example of which flash devices 41 are allowed to write/erase at the same time is shown below. If during a read operation one flash device 41 is busy, data can be reconstructed from the other flash devices 41 in that row (or RAID group) by using a simple parity reconstruction algorithm, such as described below. By using this technique, the only operation which can block a read is another read, thus reducing the read latency by an order of magnitude during high write loads.

Note that this approach is just an example; by using a different redundancy algorithm, such as a higher-level RAID, it may be possible to perform a read through data reconstruction even if two or more flash devices in a targeted group are busy.

In one embodiment, the parity byte P can be defined as follows (where numbers in parentheses indicate bit position, and "0" is the least significant bit):

P[0]=D[56] XOR D[48] XOR D[40] XOR D[32] XOR D[24] XOR D[16] XOR D[8] XOR D[0]
P[1]=D[57] XOR D[49] XOR D[41] XOR D[33] XOR D[25] XOR D[17] XOR D[9] XOR D[1]
P[2]=D[58] XOR D[50] XOR D[42] XOR D[34] XOR D[26] XOR D[18] XOR D[10] XOR D[2]
P[3]=D[59] XOR D[51] XOR D[43] XOR D[35] XOR D[27] XOR D[19] XOR D[11] XOR D[3]
P[4]=D[60] XOR D[52] XOR D[44] XOR D[36] XOR D[28] XOR D[20] XOR D[12] XOR D[4]
P[5]=D[61] XOR D[53] XOR D[45] XOR D[37] XOR D[29] XOR D[21] XOR D[13] XOR D[5]
P[6]=D[62] XOR D[54] XOR D[46] XOR D[38] XOR D[30] XOR D[22] XOR D[14] XOR D[6]
P[7]=D[63] XOR D[55] XOR D[47] XOR D[39] XOR D[31] XOR D[23] XOR D[15] XOR D[7]

The reconstruction algorithm can be as follows:

Reconstruct[bit]=XOR of D[7 valid data bits from above, plus corresponding P[bit]]

The above is just an example. Other parity calculation and data reconstruction algorithms, such as are well-known in the art, could instead be used.

Figure 8:
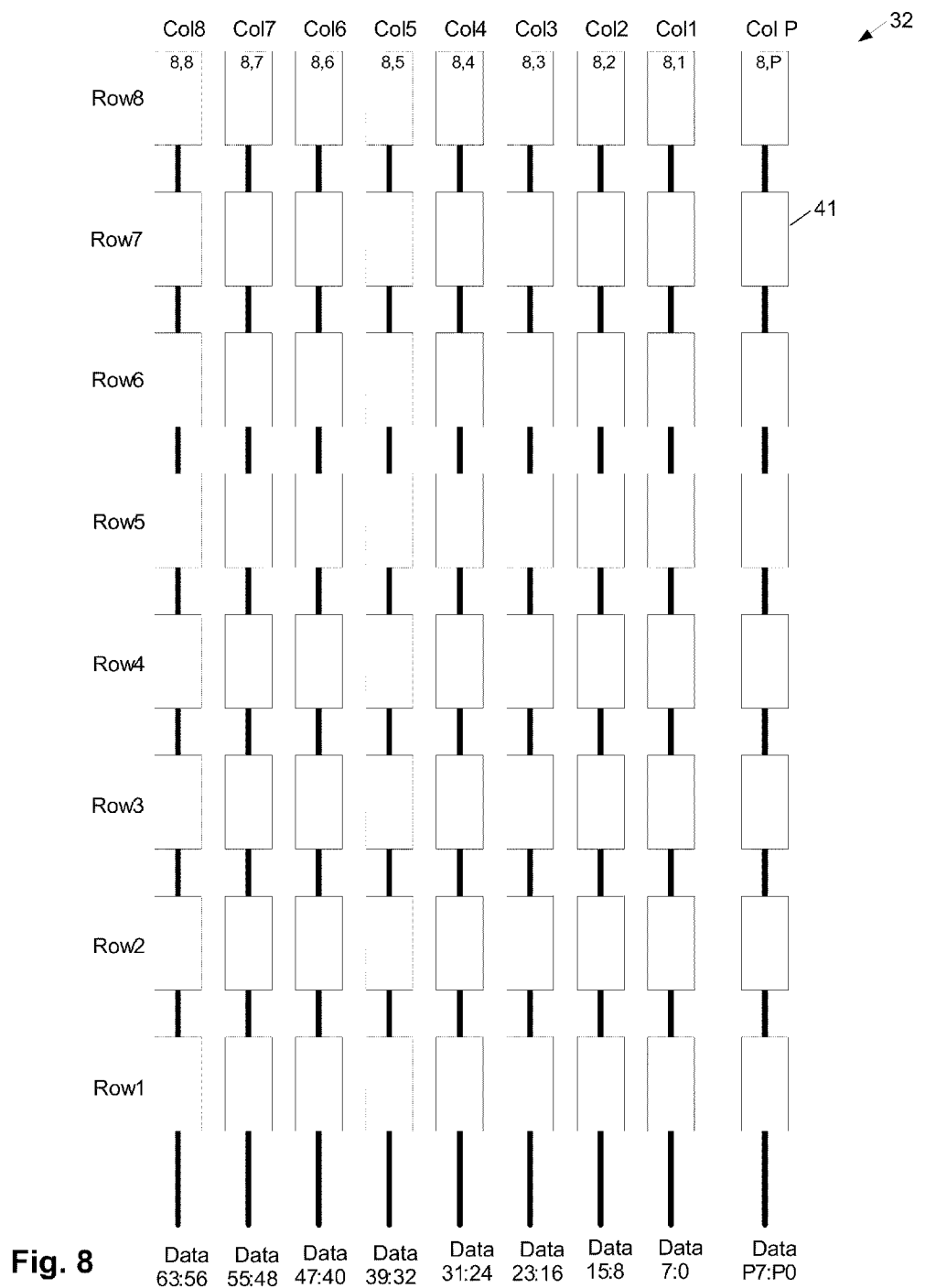
FIG. 8 shows an 8×9 array of flash memory chips.

In one embodiment, all of the flash chips 41 in any given column are bused together, as indicated by the vertical lines connecting flash devices 41 in each column in FIG. 8. In such a configuration, a data transfer by one flash device 41 in any given column will require use of the data bus for that column, thereby temporarily preventing other flash devices 41 in that same column from transferring data. To avoid delays caused by this circumstance in such a configuration, if a write operation is in progress on a flash device 41 when a read is requested, the write transfer can be paused while data is read from other rows in the array.

Note that a RAID based technique can be applied for the same purpose at a higher-level than described in this example, such as by forming RAID groups that each comprise multiple DIMMs as described above, by applying essentially the same principles described here. Likewise, RAID groups can be defined in terms of other structures, such as individual memory planes, etc.

As noted above, the RAID functionality applied to a flash array such as described here can be implemented in the storage access layer 54 of the operating system 50 of a storage server 2 (see FIG. 5). Alternatively, such functionality can be provided by a separate layer or module that is dedicated to providing such functionality to the flash storage.

Figure 9:
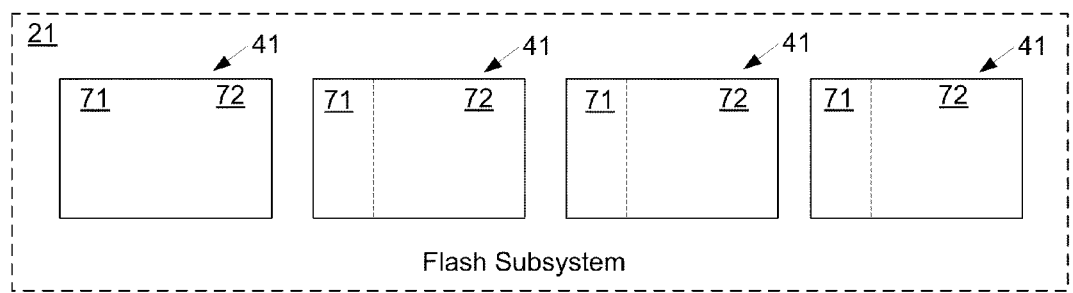
FIG. 9 illustrates a flash subsystem that includes several flash devices, each of which has a portion allocated for use as buffer cache of a storage server and another portion allocated for use as persistent mass storage of a storage server.

Another feature of the present invention is that a portion of any particular flash device (chip) in the flash subsystem can be used as buffer cache of a storage server while another portion of the same flash device can be used as part of the main persistent mass storage subsystem 4, as illustrated in FIG. 9. This can be the case for any one or more of the individual flash chips in the flash subsystem. In the example of FIG. 9, the flash subsystem 21 includes several flash devices, each of which has a first portion 71 allocated for use as buffer cache of a storage server 2 and a second portion 72 allocated for use as persistent mass storage of a storage server 2.

Figure 10:
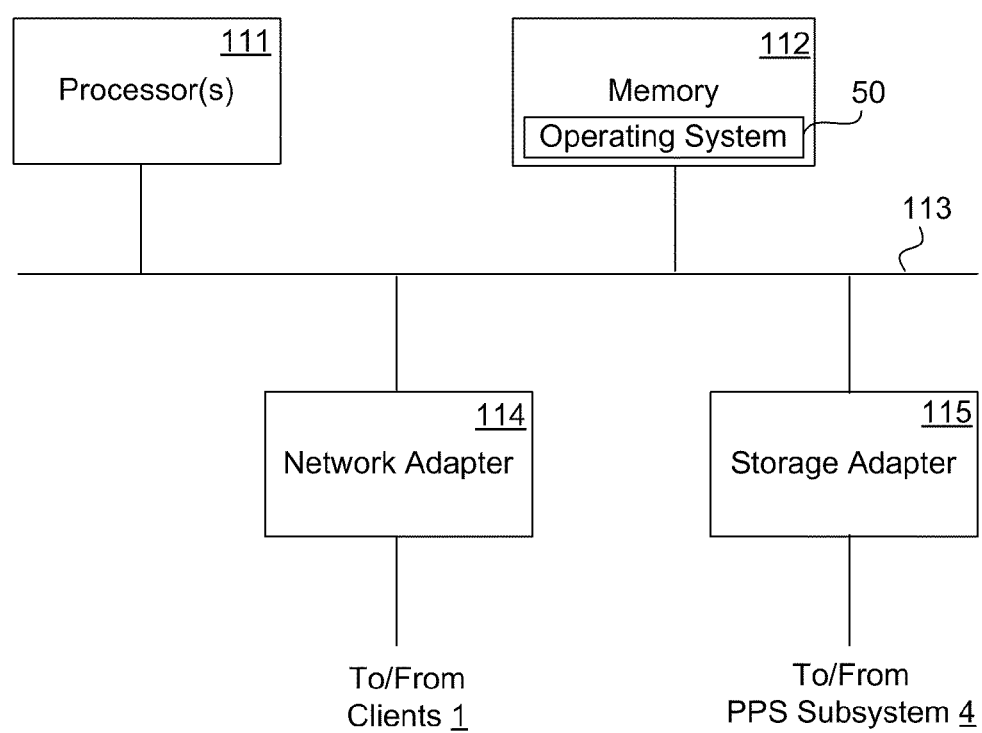
FIG. 10 is a high-level block diagram showing an example of the architecture of a storage server.

FIG. 10 is a high-level block diagram showing an example of the architecture of a storage server 2. The storage server 2 includes one or more processors 111 and memory 112 coupled to a interconnect 113. The interconnect 113 shown in FIG. 10 is an abstraction that represents any one or more separate physical buses, point-to-point connections, or both connected by appropriate bridges, adapters, or controllers. The interconnect 113, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 111 may include central processing units (CPUs) of the storage server 2 and, thus, control the overall operation of the storage server 2. In certain embodiments, the processor(s) 111 accomplish this by executing software or firmware stored in memory 112. The processor(s) 111 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 112 is or includes the main memory of the storage server 2. The memory 112 represents any form of random access memory (RAM), read-only memory (ROM), flash memory (as discussed above), or the like, or a combination of such devices. In use, the memory 112 may contain, among other things, at least a portion of the storage operating system of the storage server 2.

Also connected to the processor(s) 111 through the interconnect 113 are a network adapter 114 and a storage adapter 115. The storage adapter 115 allows the storage server 2 to access a storage subsystem 4 and may be, for example, a Fibre Channel adapter or a SCSI adapter. The network adapter 114 provides the storage server 2 with the ability to communicate with remote devices, such as clients 1, over a network 3 and may be, for example, an Ethernet adapter or Fibre Channel adapter.

In some embodiments, the flash memory discussed above is physically attached to the main motherboard (not shown) of the storage server 2. In other embodiments, the flash memory is on a separate substrate within the storage server 2. In still other embodiments, the flash memory is external to the storage server 2 (such as shown in FIG. 2).

Thus, a method and apparatus for facilitating the use of flash memory in a network storage system have been described.

The methods and processes introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
storing data in a storage subsystem formed from a plurality of non-volatile solid-state memory devices arranged in an N×M array of non-volatile solid-state memory elements, where M is at least three (3);
applying a parity based redundancy scheme to the non-volatile solid-state memory elements, including defining N redundancy groups from among the plurality of non-volatile solid-state memory elements, each said redundancy group including M nonvolatile solid-state memory elements;
scheduling operations on the storage subsystem so that erasure is limited to a predetermined sized subset of the non-volatile solid-state memory elements at a time in each said redundancy group;
in response to a request to read a first set of data, identifying a first non-volatile solid-state memory element in which at least a portion of the first set of data is stored, the first non-volatile solid-state memory element being a member of a first redundancy group of the N redundancy groups;
determining whether the first non-volatile solid-state memory element is busy;
in response to a determination that the first non-volatile solid-state memory element is not busy, reading the first set of data from the first non-volatile solid-state memory element;
in response to a request to read a second set of data, identifying a second non-volatile solid-state memory element in which at least a portion of the second set of data is stored, the second non-volatile solid-state memory element being a member of a second redundancy group of the N redundancy groups;
determining whether the second non-volatile solid-state memory element is busy; and
in response to a determination that the second non-volatile solid-state memory element is busy, reading information from the other non-volatile solid-state memory elements in the second redundancy group and reconstructing the second set of data from the information read from the other non-volatile solid-state memories in the second redundancy group.

2. A method as recited in claim 1, wherein said scheduling operations comprises scheduling operations so that erasure is not allowed on all of the non-volatile solid-state memory elements at a time in each redundancy group of the array.

3. A method as recited in claim 1, wherein a memory element is considered to be busy if the memory element is performing an erase or write.

4. A method as recited in claim 1, wherein the plurality of non-volatile solid-state memory elements comprises a plurality of flash memory elements.

5. A method as recited in claim 1, wherein each said memory element is a memory chip.

6. A method as recited in claim 1, wherein each said memory element is an independent plane or group of planes of a memory chip.

7. A method as recited in claim 1, wherein each said memory element is a module comprising a plurality of memory chips.

8. A storage system comprising:
a communication interface through which to communicate with an external host via a network;
a storage interface through which to access a plurality of non-volatile solid-state memory devices arranged as an N×M array of non-volatile solid-state memory elements, where M is at least three (3); and a processor which, in operation, performs a set of operations including applying a parity based redundancy scheme to the array, including defining N redundancy groups from among the plurality of non-volatile solid-state memory elements, each said redundancy group including M non-volatile solid-state memory elements;

scheduling operations on the storage subsystem so that erasure is limited to a predetermined sized subset of the non-volatile solid-state memory elements at a time in each said redundancy group;

in response to a request from the host to read a first set of data, identifying a first non-volatile solid-state memory element in which at least a portion of the first set of data is stored, the first non-volatile solid-state memory element being a member of a first redundancy group of the N redundancy groups;

determining whether the first non-volatile solid-state memory element is busy;

in response to a determination that the first non-volatile solid-state memory element is not busy, reading the first set of data from the first non-volatile solid-state memory element;

in response to a request to read a second set of data, identifying a second non-volatile solid-state memory element in which at least a portion of the second set of data is stored, the second non-volatile solid-state memory element being a member of a second redundancy group of the N redundancy groups;

determining whether the second non-volatile solid-state memory element is busy; and in response to a determination that the second non-volatile solid-state memory element is busy, reading information from the other non-volatile solid-state memory elements in the second redundancy group and reconstructing the second set of data from the information read from the other non-volatile solid-state memories in the second redundancy group.

9. A storage system as recited in claim 8, wherein said scheduling operations comprises scheduling operations so that erasure is not allowed on all of the non-volatile solid-state memory elements at a time in each redundancy group of the array.

10. A storage system as recited in claim 8, wherein a memory element is considered to be busy if the memory element is performing an erase or write.

11. A storage system as recited in claim 8, wherein the plurality of non-volatile solid-state memory elements comprises a plurality of flash memory elements.

12. A storage system as recited in claim 8, wherein each said memory element is a memory chip.

13. A storage system as recited in claim 8, wherein each said memory element is an independent plane or group of planes of a memory chip.

14. A storage system as recited in claim 8, wherein each said memory element is a module comprising a plurality of memory chips.

* * * * *